(12) United States Patent
Lee (10) Patent No.: US 8,174,201 B2
(45) Date of Patent: May 8, 2012

(54) SELF-OSCILLATING TRANSFORMERLESS ELECTRONIC BALLAST

(76) Inventor: Sheng-Hann Lee, Saratoga, CA (US)

( * ) Notice: Subject to any disclaimer, the term of this patent is extended or adjusted under 35 U.S.C. 154(b) by 432 days.

(21) Appl. No.: 12/500,611

(22) Filed: Jul. 10, 2009

(65) Prior Publication Data

US 2010/0244715 A1 Sep. 30, 2010

Related U.S. Application Data

(60) Provisional application No. 61/163,031, filed on Mar. 24, 2009.

(51) Int. Cl.
*H05B 37/02* (2006.01)
(52) U.S. Cl. .................... 315/224; 315/246; 315/291
(58) Field of Classification Search .............. 315/209 R, 315/224, 246, 291
See application file for complete search history.

(56) References Cited

U.S. PATENT DOCUMENTS

| | | | |
|---|---|---|---|
| 5,694,006 A | 12/1997 | Konopka | |
| 5,914,570 A * | 6/1999 | Nerone et al. | 315/209 R |
| 5,969,481 A * | 10/1999 | Konopka | 315/209 R |
| 6,144,173 A * | 11/2000 | Nerone | 315/291 |
| 7,940,535 B2 * | 5/2011 | Itoh et al. | 363/21.12 |

* cited by examiner

*Primary Examiner* — Jason M Crawford
(74) *Attorney, Agent, or Firm* — Winston Hsu; Scott Margo (57) ABSTRACT

An electronic ballast includes a rectifier circuit having a first output terminal for coupling with a lamp; a first inductor coupled with a first node; a resonant network coupled with the first node; a first capacitor coupled with the first node; a first resistor coupled with a second node; a second resistor coupled with a second output terminal of the rectifier circuit; a power switch having an output end, a ground end and a control end, wherein the output end is coupled with the first node and the ground end is coupled with the second resistor; a voltage divider for driving the power switch; and a second inductor coupled between the second node and the control end of the power switch.

31 Claims, 7 Drawing Sheets

SELF-OSCILLATING TRANSFORMERLESS ELECTRONIC BALLAST

CROSS REFERENCE TO RELATED APPLICATIONS

This application claims the benefit of U.S. Provisional Application No. 61/163,031, which was filed on Mar. 24, 2009, and entitled "SINGLE SWITCH ELECTRONIC BALLAST".

BACKGROUND OF THE INVENTION

1. Field of the Invention

The present invention relates to an electronic ballast, and more particularly, to a self-oscillating transformerless electronic ballast using only two-terminal inductors and capacitors in conjunction with a lamp in the feedback path.

2. Description of the Prior Art

Traditional magnetic coil ballasts are well known to have many operational disadvantages, such as poor energy efficiency and high flicker. Electronic ballasts overcome the shortcomings of magnetic coil ballasts. However, existing electronic ballasts commonly include two switches for converting a dc signal into a high-frequency ac signal furnished to start and operate discharge lamps. Furthermore, the switches of existing electronic ballasts are generally driven by an integrated circuit, resulting in a considerably higher monetary cost. Other existing manners of starting discharge lamps include the use of resistive electronic ballasts having glow bottle starters. It is then deemed desirable to provide electronic ballast constructed with minimal components for achieving a reduction of circuit cost and complexity thereof.

SUMMARY OF THE INVENTION

In accordance with one embodiment of the present invention, a self-oscillating transformerless electronic ballast having simplified architecture is disclosed. The electronic ballast comprises a rectifier circuit, a first inductor, a second inductor, a first capacitor, a second capacitor, a first resistor, a second resistor, a third capacitor, a power switch, a third inductor and a third resistor. The rectifier circuit has a pair of input terminals for receiving an ac input voltage and a pair of output terminals for outputting a dc voltage. A first output terminal of the rectifier circuit is coupled with a second node. The first inductor is coupled with a first node of the lamp. The second inductor is coupled with a fifth node and a fourth node of the lamp. The first capacitor is coupled with the fifth node and the second node. The second capacitor is coupled with a sixth node. The first resistor is coupled with the sixth node. The second resistor is coupled with a second output terminal of the rectifier circuit. The third capacitor and the third resistor are coupled in series between the sixth node and the second output terminal of the rectifier circuit. The power switch has an output end, a ground end and a control end. The output end of the power switch is coupled with the fifth node. The ground end of the power switch is coupled with the second resistor. The third inductor is coupled between the sixth node and the control end of the power switch.

The present invention further discloses a lighting system having simplified architecture. The lighting system comprises an ac input source, a lamp, and an electronic ballast. The ac input source generates an ac input voltage. The lamp to be driven includes a first filament and a second filament. The first filament is coupled between a first node and a second node and the second filament is coupled between a third node and a fourth node. The electronic ballast is coupled across the ac input source and the lamp for powering the lamp.

The electronic ballast comprises a rectifier circuit, an input capacitor, a first inductor, a second inductor, a first capacitor, a second capacitor, a first resistor, a second resistor, a third capacitor, a power switch, a third inductor and a third resistor. The rectifier circuit has a pair of input terminals for receiving the ac input voltage and a pair of output terminals for outputting a dc voltage. A first output terminal of the rectifier circuit is coupled with the second node. The input capacitor is coupled with the output terminals of the rectifier circuit. The first inductor is coupled with a fifth node and the first filament of the lamp. The second inductor is coupled with the fifth node and the second filament of the lamp. The first capacitor is coupled with the fifth node and the first filament of the lamp. The second capacitor is coupled with a sixth node and the second filament of the lamp. The first resistor is coupled with the sixth node and the second filament of the lamp. The second resistor is coupled with a second output terminal of the rectifier circuit. The third capacitor and the third resistor are coupled in series between the sixth node and the second output terminal of the rectifier circuit. The power switch has an output end, a ground end and a control end. The output end of the power switch is coupled with the fifth node. The ground end of the power switch is coupled with the second resistor. The third inductor is coupled between the sixth node and the control end of the power switch.

Still, the present invention discloses another electronic ballast comprising a rectifier circuit, a first inductor, a resonant network, a first capacitor, a first resistor, a second resistor, a power switch, a voltage divider, a second inductor, and a third resistor. The rectifier circuit receives an ac input voltage and has a first output terminal for coupling with a second node of a lamp. The first inductor has a first end coupled with a fifth node and a second end for coupling with a first node of the lamp. The resonant network is coupled with the fifth node and a sixth node for striking the lamp through a third node and a fourth node of the lamp. The first capacitor has a first end coupled with the fifth node and a second end for coupling with the second node. The first resistor has a first end coupled with the sixth node and a second end for coupling with the third node. The second resistor is coupled with a second output terminal of the rectifier circuit. The power switch has an output end coupled with the fifth node, a ground end coupled with the second resistor, and a control end. The voltage divider is for driving the power switch. The second inductor is coupled between the sixth node and the control end of the power switch.

Further, the present invention discloses another electronic ballast comprising a rectifier circuit, a power switch, a biasing circuit, a voltage divider, and a power-regulating circuit. The rectifier circuit receives an ac input voltage and has an output terminal for coupling with a lamp. The power switch is coupled with the rectifier for providing a sinusoidal driving signal to drive the lamp. The biasing circuit is for biasing the power switch. The voltage divider is for driving the power switch. The power-regulating circuit is coupled with the power switch for restricting the drive to the power switch.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
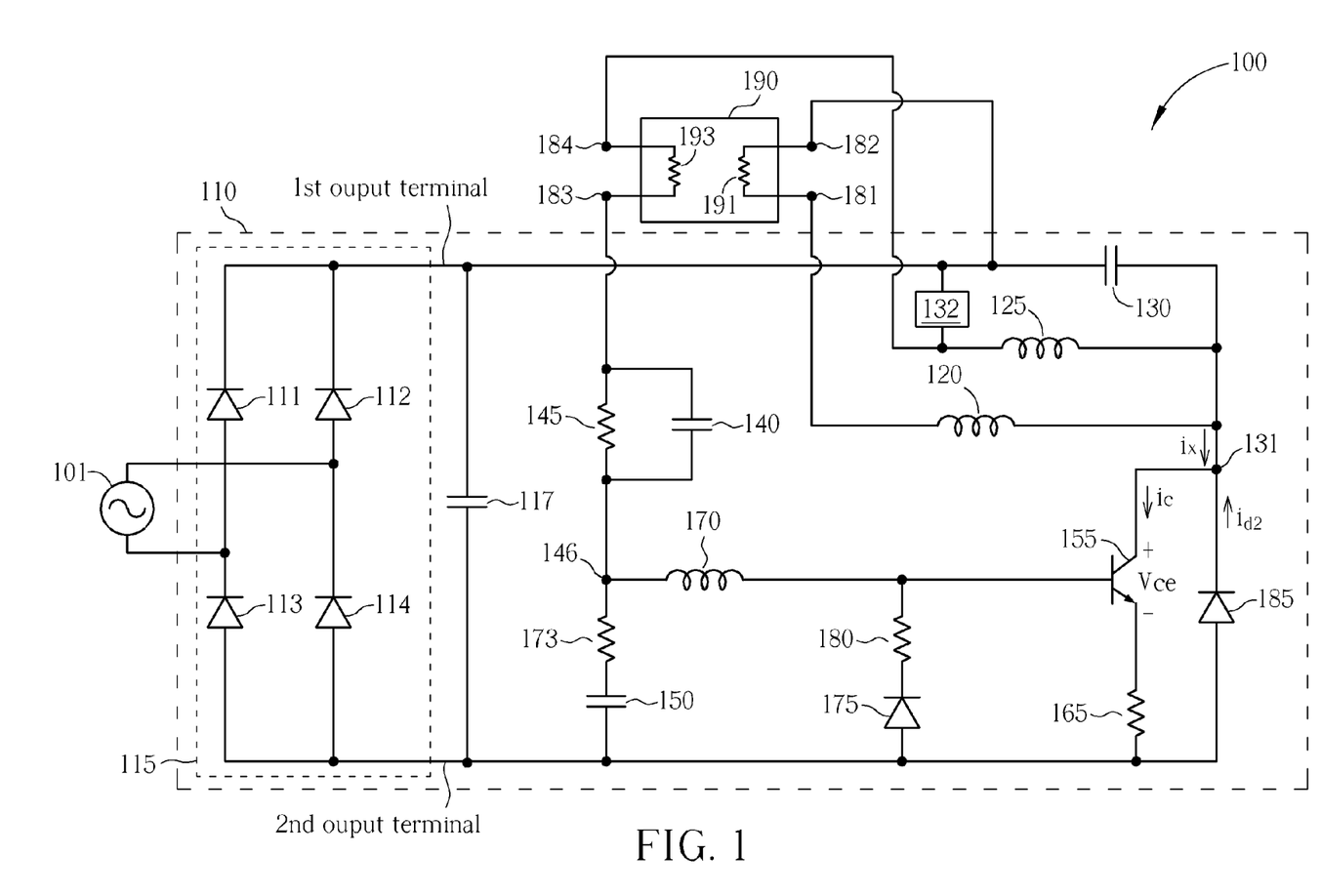
FIG. 1 is a circuit diagram schematically showing an electronic ballast in accordance with a first embodiment of the present invention.

Please refer to FIG. 1, which is a circuit diagram schematically showing an electronic ballast in accordance with a first embodiment of the present invention. As shown in FIG. 1, the lighting system 100 comprises an ac input source 101, a lamp 190 and an electronic ballast 110. The ac input source 101 is employed to generate an ac input voltage. The lamp 190 can be a discharge lamp including a first filament 191 and a second filament 193. In one embodiment, the lamp 190 is a hot-cathode fluorescent lamp (HCFL). In another embodiment, the lamp 190 is a cold-cathode fluorescent lamp (CCFL) or an external electrode fluorescent lamp (EEFL). The first filament 191 is coupled with a first node 181 and a second node 182. The second filament 193 is coupled with a third node 183 and a fourth node 184. The electronic ballast 110 is coupled with the ac input source 101 and the lamp 190 for powering the lamp 190.

The electronic ballast 110 comprises a rectifier circuit 115, an input capacitor 117, a first inductor 120, a second inductor 125, a third inductor 170, a first capacitor 130, a second capacitor 140, a third capacitor 150, a first resistor 145, a second resistor 165, a third resistor 173, a fourth resistor 180, a first diode 175, a second diode 185, a positive temperature coefficient (PTC) resistor 132 and a power switch 155. The power switch 155 prefers to be a bipolar junction transistor (BJT). In case a metal oxide semiconductor (MOS) field effect transistor is used for the power switch 155, an extra capacitor is added between the control end and the source end of the MOS field effect transistor while the first diode 175 and the fourth resistor 180 are omitted.

The rectifier circuit 115 functions to convert the ac input voltage into a dc voltage. A pair of input terminals of the rectifier circuit 115 is adapted to receive the ac input voltage. A pair of output terminals of the rectifier circuit 115 is utilized for outputting the dc voltage and the first output terminal of the rectifier circuit 115 is coupled with the second node 182. The rectifier circuit 115 can be a full-wave bridge rectifier circuit including four diodes 111~114 as shown in FIG. 1. The lighting system 100 may further comprise an electromagnetic interference (EMI) filter (not shown) coupled with the input terminals or the output terminals of the rectifier circuit 115. The input capacitor 117, coupled with the output terminals of the rectifier circuit 115, is employed to store and filter the dc voltage outputted from the rectifier circuit 115.

The first inductor 120 has a first end coupled with a fifth node 131 and a second end coupled with the first node 181. The first inductor 120 functions as an ac current source. The second inductor 125 is coupled with the fifth node 131 and the fourth node 184. The first capacitor 130 has a first end coupled with the fifth node 131 and a second end coupled with the first output terminal of the rectifier circuit 115. The second capacitor 140 has a first end coupled with a sixth node 146 and a second end coupled with the third node 183. The first resistor 145 has a first end coupled with the sixth node 146 and a second end coupled with the third node 183. The third capacitor 150 and the third resistor 173 are coupled in series between the sixth node 146 and the second output terminal of the rectifier circuit 115. The power switch 155 comprises an output end coupled with the fifth node 131, a ground end coupled with the second resistor 165, and a control end coupled with the third inductor 170. The power switch 155 is configured as a class E amplifier for providing a sinusoidal driving signal with high ac voltage to light the lamp 190. The second resistor 165 is coupled with the ground end of the power switch 155 and the second output terminal of the rectifier circuit 115.

The third inductor 170 is coupled between the sixth node 146 and the control end of the power switch 155. The operating frequency of the electronic ballast 110 in a strike phase is substantially determined by the second inductor 125 and the second capacitor 140. The third capacitor 150 and the second capacitor 140 form a voltage divider so as to provide a fractional feedback signal fitting for driving the power switch 155 with the third resistor 173 in series with the third capacitor 150 to lower the quality factor (Q) regarding the voltage divider. Only in the burn phase the operating frequency of the electronic ballast 110 is substantially influenced by the third inductor 170 and the third capacitor 150, which also match the impedance of the lamp 190 to the power switch 155 till the desired lamp power is achieved. The first diode 175 and the fourth resistor 180 are coupled in series between the control end of the power switch 155 and the second output terminal of the rectifier circuit 115. The first diode 175 is operative to allow one-way current flow from the second output terminal of the rectifier circuit 115 to the control end of the power switch 155. The second diode 185 is coupled with the fifth node 131 and the second output terminal of the rectifier circuit 115. The second diode 185 is operative to allow one-way current flow from the second output terminal of the rectifier circuit 115 to the fifth node 131. The PTC resistor 132 restricts the drive to the power switch 155 during the strike phase. The circuit functionalities of the lighting system 100 regarding the embodiment shown in FIG. 1 are detailed as the followings.

The second inductor 125 and the second capacitor 140 form a resonant network that strikes the lamp 190. In a strike phase during which the electronic ballast 110 ignites the lamp 190, the resonant network formed by the second inductor 125 and the second capacitor 140 is further employed to heat the second filament 193 of the lamp 190. That is, the current flowing through the second capacitor 140 can be employed to heat the second filament 193 of the lamp 190 in a strike phase for performing a rapid-start operation. Also, the current flowing through the first inductor 120 can be employed to heat the first filament 191 of the lamp 190 in a strike phase for performing the rapid-start operation. The second inductor 125, the third inductor 170, the second capacitor 140 and the third capacitor 150 in conjunction with the lamp 190 are further put in use for functioning as plural phase shifters to form a positive feedback mechanism required for a self-oscillating ballast.

The current $i_x$ flowing through the power switch 155 is diverted to flow through the first capacitor 130 while turning off the power switch 155. That is, the current $i_x$ is continuous while turning off the power switch 155. The second diode 185 is employed to bypass a current $i_{d2}$ when the power switch 155 is operating in a reverse conduction mode, i.e. the output end of the power switch 155 is forward-biased and the ground end of the power switch 155 is reverse-biased. The second capacitor 140 and the third capacitor 150 are employed to divide a load voltage of the lamp 190 so that a desirable small voltage across the third capacitor 150 can be provided to drive the power switch 155. The third resistor 173 is in series with the third capacitor 150 to lower the quality factor (Q) regarding the capacitive voltage divider for equalizing the phase shift difference caused by lamp impedance changes between the strike and burn phases. In addition, the first diode 175 takes advantage of the long charge-storage time (e.g. 2 uS) of a general-purpose diode to promote the zero voltage-switching (ZVS) at the control end of the power switch 155. While the first diode 175 and the fourth resistor 180 form a switching-transient voltage suppressor at the control end of the power switch 155, the fourth resistor 180 also sets the negative bias voltage properly at the control end of the power switch 155 to regulate the drive to the power switch 155. Accordingly, the lifetime of the lamp 190 can be enhanced significantly in that the electronic ballast 110 is capable of avoiding an over-driving situation especially in a strike phase. In addition, since the filaments 191, 193 of the lamp 190 are heated promptly while performing a rapid-start operation during a strike phase, the lifetime of the lamp 190 can be further extended. In other aspect, the operation of the electronic ballast 110 without over-driving situation is more likely to protect the power switch 155 from over stress.

When the electronic ballast 110 is initially powered by the ac input source 101 during a strike phase, the dc voltage generated by the rectifier circuit 115 is used to provide a dc bias to start up the power switch 155 via the first resistor 145 and the second resistor 165. The control end of the power switch 155 is mainly biased according to the first resistor 145. It is noted that the current flowing through the first inductor 120 for biasing can also be used to heat the first filament 191 as aforementioned. After the power switch 155 is properly biased during a strike phase, the electronic ballast 110 performs an oscillation operation for generating an ac-driving signal. The ac-driving signal is then employed to heat the filaments 191, 193 and provide a high-voltage drop between opposite sides of the lamp 190 for igniting the lamp 190 under a high-Q condition. In comparison with a prior-art half-bridge inverter having trigger and disable circuits for properly activating power switches during a strike phase, the electronic ballast 110 is able to activate the power switch 155 without the aid of any trigger or disable circuit, i.e. the circuit structure of the electronic ballast 110 can be significantly simplified to bring the cost down.

While the electronic ballast 110 is oscillating during a strike phase, the second inductor 125 and the second capacitor 140 substantially cause a phase inversion at their common junction due to high impedance between opposite sides of the lamp 190. Based on the demand for high power efficiency, the third capacitor 150 and the second capacitor 140 are employed to form a capacitive voltage divider for providing the desirable small voltage to drive the power switch 155 as aforementioned; however, being capacitors, the third capacitor 150 and the second capacitor 140 advance the phase of an oscillating signal at the sixth node 146 slightly. The third inductor 170 and the third capacitor 150 form a resonant network having a resonant frequency below an operating frequency of the electronic ballast 110 and retards the phase beneficially in the strike phase. Last, the first diode 175 takes advantage of the long charge-storage time (e.g. 2 uS) of a general-purpose diode to promote the ZVS at the control end of the power switch 155. The second resistor 165 may further be used to stabilize the input resistance of the power switch 155 under various operating temperatures or manufacturing processes.

While the electronic ballast 110 is oscillating during a burn phase under low lamp impedance, the second inductor 125 and the second capacitor 140 only cause a limited phase lag while the second capacitor 140 and the third capacitor 150 cause a minor phase lead on the feedback path from the fifth node 131 to the sixth node 146. Since the third inductor 170, the third capacitor 150 and the second capacitor 140 form a resonant network having a resonant frequency below an operating frequency of the electronic ballast 110, the third inductor 170, the third capacitor 150 and the second capacitor 140 compensate the decreased phase lag of an oscillating signal at the control end of the power switch 155 under low lamp impedance situation. Last, the first diode 175 takes advantage of the long charge-storage time (e.g. 2 uS) of a general-purpose diode to promote the ZVS at the control end of the power switch 155.

By taking advantage of the negative impedance feature of the lamp 190, the electronic ballast 110 is further able to provide power-regulation functionality by counteracting the power variations furnished to the lamp 190. For instance, when the lamp 190 is over powered with undesirable high driving current, the impedance between opposite sides of the lamp 190 becomes lower thus reducing the voltage of an ac driving signal across the lamp 190, which in turn decreases the voltage of an oscillating signal furnished to the control end of the power switch 155 and therefore pulls down the power for driving the lamp 190. In view of that, compared with the prior-art electronic ballast with either load current regulation mechanism using saturating magnetic core in series with the lamp 190, or using low impedance devices to cause voltage limiting at the control end of the power switch, the lamp powering mechanism of the electronic ballast 110 having power-regulation functionality is able to provide a more stable lamp power through suppressing lamp power variation caused by the input variations of the ac input source 101. However, the lamp lacks power-regulating capability during the strike phase, so the PTC resistor 132 is uniquely coupled with the second node 182 and the fourth node 184 to restrict the drive to the power switch 155 for an extended lifetime without affecting dc continuity detections of the first filament 191 and the second filament 193, i.e. each continuity detection has a feeding point and a sensing point, respectively, and the placement of the PTC resistor 132 avoids bridging two independent sensing points together.

Therefore, if the first filament 191 is burned out, the electronic ballast 110 is automatically shut down because the converted dc voltage cannot be furnished to the output end of the power switch 155. Also, if the second filament 193 is burned out, the electronic ballast 110 is also automatically shut down because the startup dc bias to the control end of the power switch 155 is turned off. Still, if there is any open-circuit event occurring to the third inductor 170 or the second resistor 165, the electronic ballast 110 is automatically shut down as well since the startup dc bias cannot function properly as aforementioned. In view of that, another important feature of the lighting system 100 lies in the fact that the electronic ballast 110 is automatically shut down following a burn-out event of the lamp 190 or an open-circuit event regarding parts of the components therein so as to prevent damaging the circuit.

Figure 2:
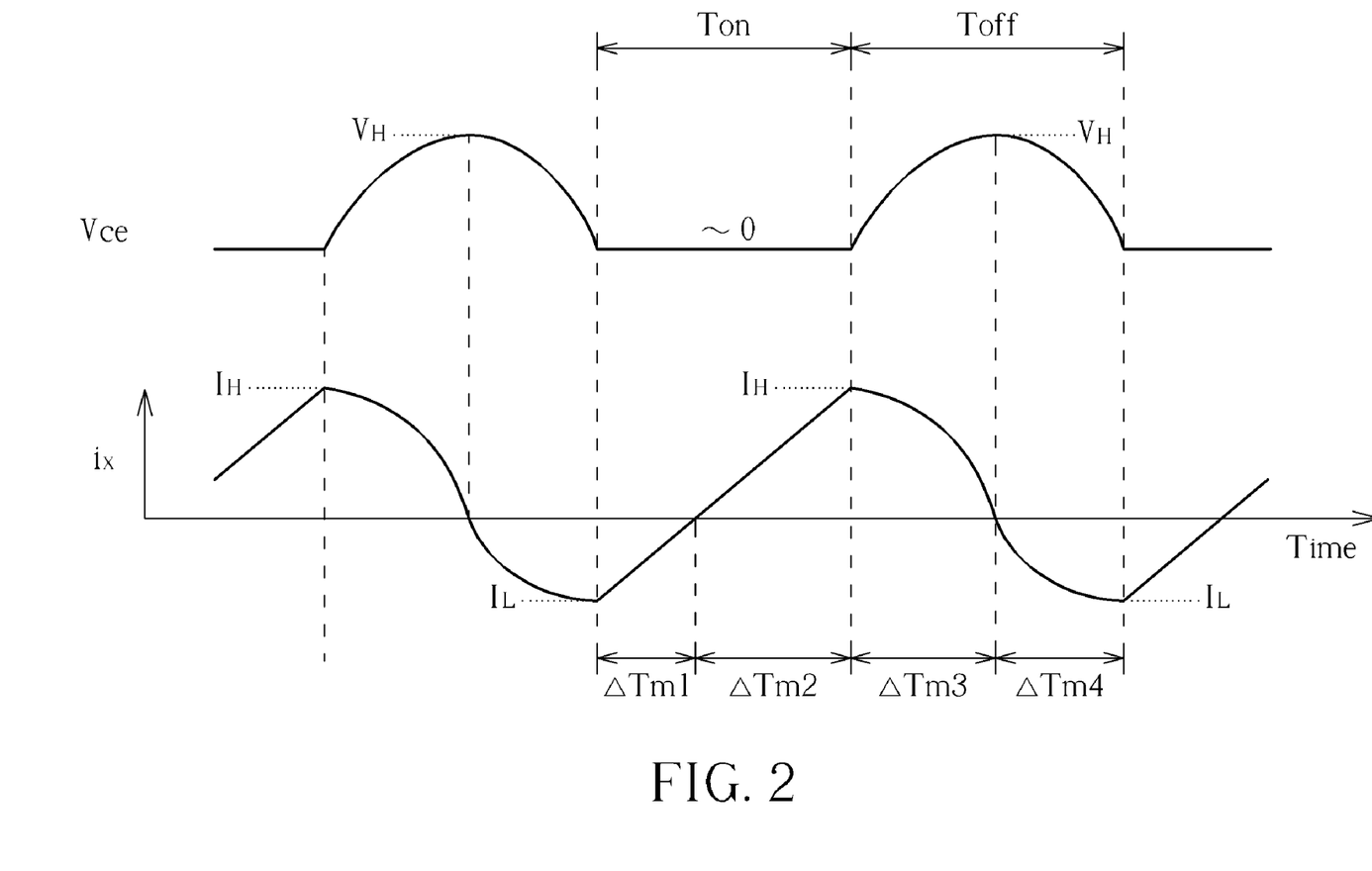
FIG. 2 is a schematic diagram showing the related signal waveforms regarding operations of the electronic ballast in FIG. 1, having time along the abscissa.

FIG. 2 is a schematic diagram showing the related signal waveforms regarding operations of the electronic ballast 110 in FIG. 1, having time along the abscissa. The signal waveforms in FIG. 2, from top to bottom, are the collector-emitter voltage drop $v_{ce}$ of the power switch 155, i.e. assumed to be a bipolar junction transistor, and the current $i_x$. Please refer to FIG. 2 together with FIG. 1, when the power switch 155 is turned on during an interval Ton, the collector-emitter voltage drop $v_{ce}$ is retained to be around zero; meanwhile, the current $i_x$ is increasing almost linearly from a low current $I_L$, which is actually a negative current, to a high current $I_H$.

When the power switch 155 is operating in a reverse conduction mode during a fore time period ΔTm1 of the interval Ton, the current $i_x$ is negative and the collector current $i_c$ is also negative In the meantime, the second diode 185 is employed to bypass a current $i_{d2}$, i.e. most part of the current $i_x$ is flowing through the second diode 185 and only little part of the current $i_x$ is flowing through the power switch 155 for preventing switch deterioration. When the power switch 155 is operating in a forward conduction mode during a rear time period ΔTm2 of the interval Ton, the current $i_x$ is positive and substantially equals to the collector current $i_c$.

When the power switch 155 is turned off during an interval Toff, the collector-emitter voltage drop $v_{ce}$ is changing to roughly form a positive half cycle of sinusoidal wave; meanwhile, the current $i_x$, which is then diverted to flow through the first capacitor 130, is decreasing from the high current $I_H$ to the low current $I_L$. It is noted that an occurrence of abrupt change regarding the current $i_x$ is prevented by diverting the current $i_x$ to flow through the first capacitor 130 while turning off the power switch 155. During a fore time period ΔTm3 of the interval Toff regarding a charging mode of the first capacitor 130, the current $i_x$ is positive and the collector-emitter voltage drop $v_{ce}$ is boosted to a high voltage $V_H$ by charging the first capacitor 130. During a rear time period ΔTm4 of the interval Toff regarding a discharging mode of the first capacitor 130, the current $i_x$ is negative and the collector-emitter voltage drop $v_{ce}$ is pulled down to around zero by discharging the first capacitor 130. It is noted that the collector-emitter voltage drop $v_{ce}$ approximates zero while the power switch 155 is turning on or off, which means that the ballast 110 is capable of operating in ZVS mode for protecting the power switch 155.

The collector-emitter voltage drop $v_{ce}$ having pulsing feature is furnished backwards to the feedback path of the electronic ballast 110 for oscillating to generate an ac driving signal having sinusoidal wave feature across opposite sides of the lamp 190. Furthermore, with the aid of plural phase-shifting mechanisms incorporating only two-terminal inductors and capacitors in conjunction with the lamp 190 in the electronic ballast 110 as aforementioned, the oscillating signal of the electronic ballast 110 can be easily geared to achieve an exact positive feedback operation.

Figure 3:
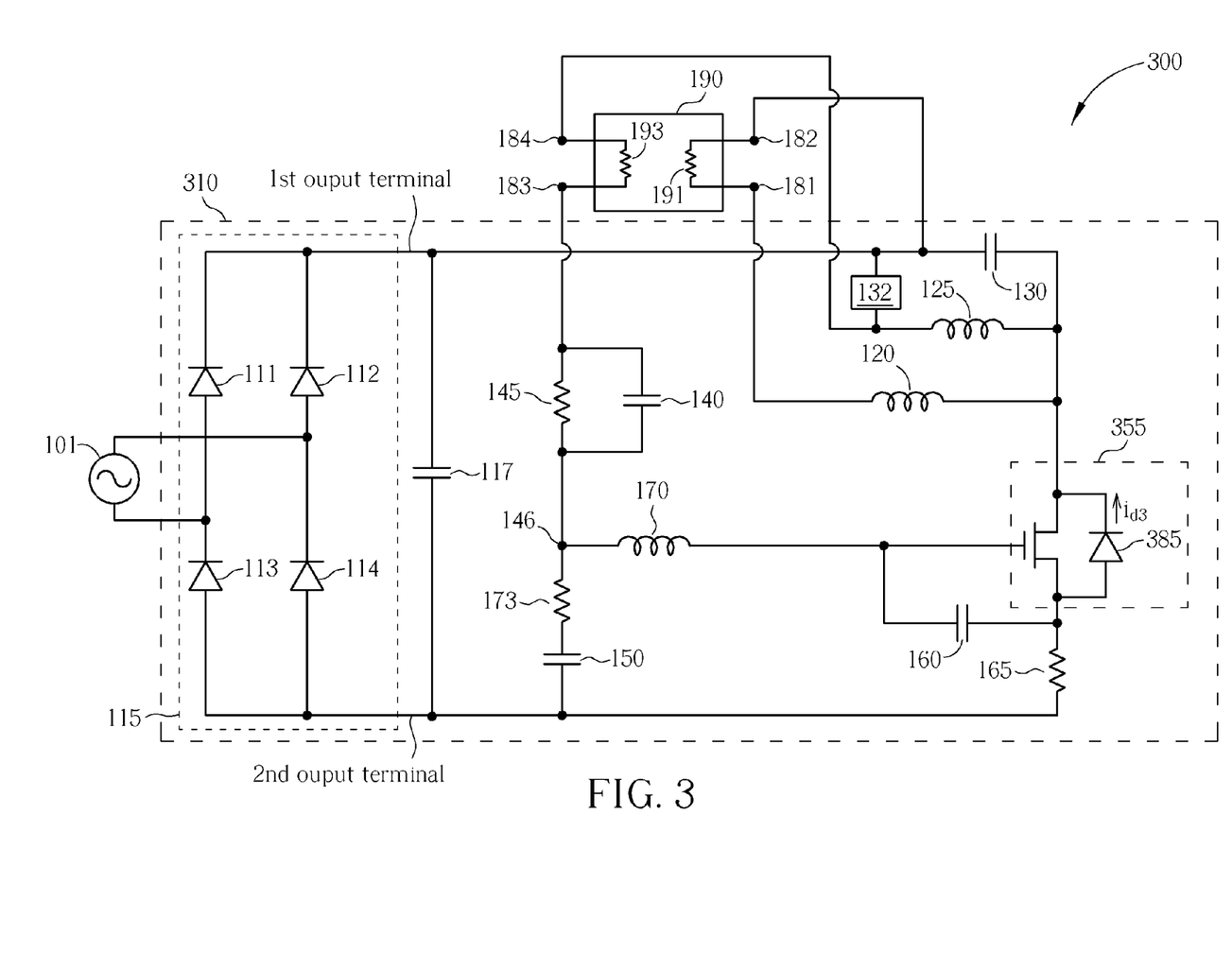
FIG. 3 is a circuit diagram schematically showing an electronic ballast in accordance with a second embodiment of the present invention.

Please refer to FIG. 3, which is a circuit diagram schematically showing an electronic ballast in accordance with a second embodiment of the present invention. As shown in FIG. 3, the lighting system 300 comprises the ac input source 101, the lamp 190 and an electronic ballast 310. The electronic ballast 310 is similar to the electronic ballast 110 shown in FIG. 1, differing in that the first diode 175, the second diode 185 and the fourth resistor 180 are omitted, and the power switch 155 is replaced with a power switch 355. Also a fourth capacitor 160 is coupled between the control end of the power switch 355 and the ground end (source end) of the power switch 355. The power switch 355 is a MOSFET having a parasitic diode 385 between the output and ground ends thereof as shown in FIG. 3. The parasitic diode 385 is utilized to bypass a current $i_{d3}$ when the power switch 355 is operating in a reverse conduction mode, i.e. for providing the functionality of the second diode 185 omitted. Since there is no dc current flowing between the second output terminal of the rectifier circuit 115 and the control end of the power switch 355, the first diode 175 and the fourth resistor 180 can be omitted without affecting the dc bias. Instead, the MOS capacitor of the power switch 355 in conjunction with the fourth capacitor 160 can be employed to provide a phase compensation mechanism for achieving the required ZVS mode.

Figure 4:
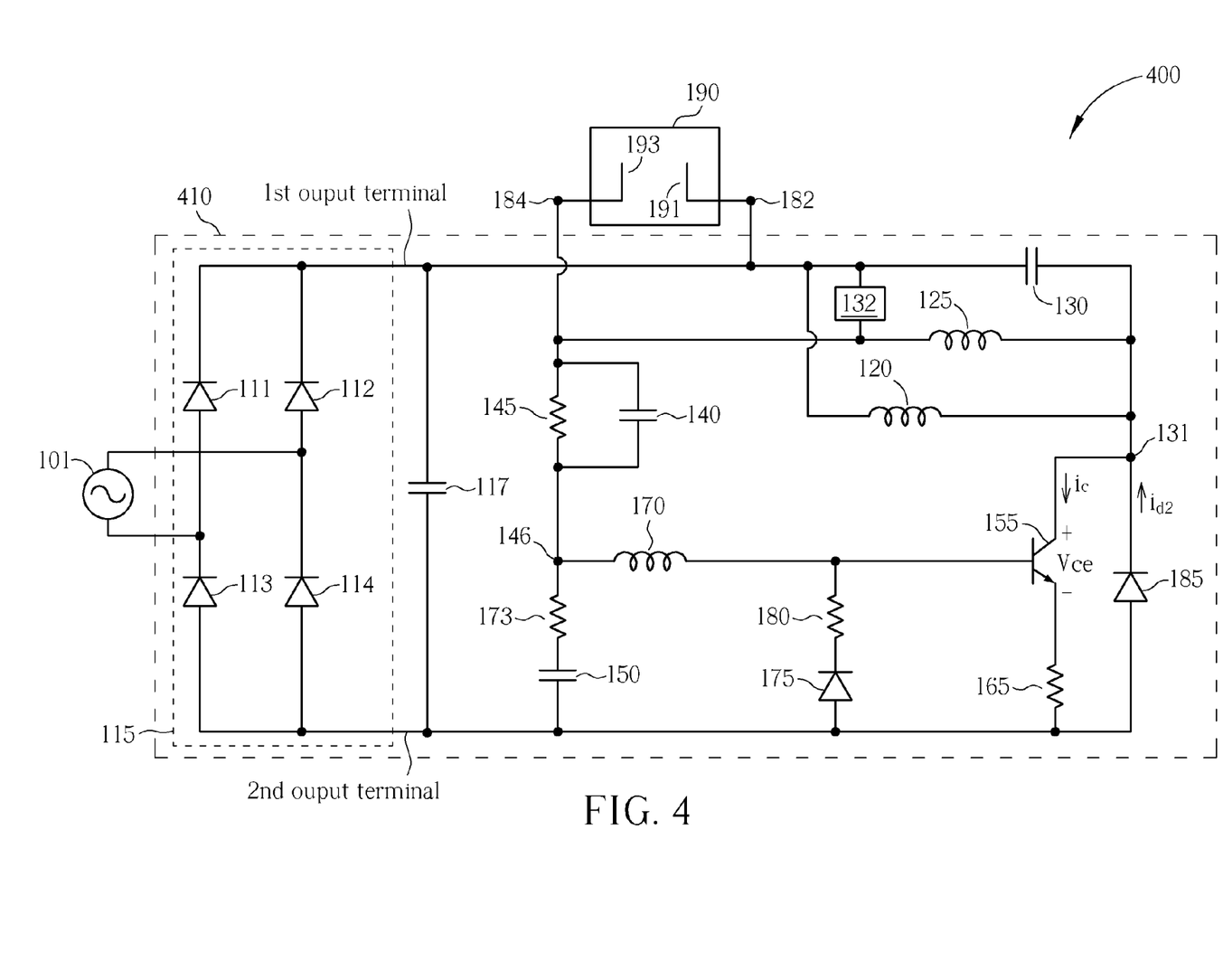
FIG. 4 is a circuit diagram schematically showing an electronic ballast in accordance with a third embodiment of the present invention.

Please refer to FIG. 4, which is a circuit diagram schematically showing an electronic ballast in accordance with a third embodiment of the present invention. As shown in FIG. 4, the lighting system 400 comprises the ac input source 101, the lamp 190 and an electronic ballast 410. Since the electronic ballast 410 is configured as a class E amplifier to provide a sinusoidal driving signal with very high ac voltage to light the lamp 190, depending on actual design, its ac voltage swing is easily four times the dc voltage while a half-bridge inverter is limited to a rail-to-rail swing of the dc voltage. Therefore, the second capacitor 140 and the first resistor 145 can be coupled with the sixth node 146 and the fourth node 184 as aforementioned in another couple possibility of the lighting system 100, i.e. there is no heating or shutdown mechanism available for the second filament 193. So can the first inductor 120 move to the second node 182 to eliminate heating on the first filament 191. Under such situation, the lamp 190 can be a cold-cathode fluorescent lamp (CCFL) or an external electrode fluorescent lamp (EEFL) to be driven only based on the sinusoidal driving signal of the electronic ballast 410 without the need of filament heating mechanism.

The circuit functionalities of the lighting system 400 regarding other couple possibilities can be inferred by analog according to the aforementioned circuit operations and, for the sake of brevity, further similar discussion thereof is omitted.

Figure 5:
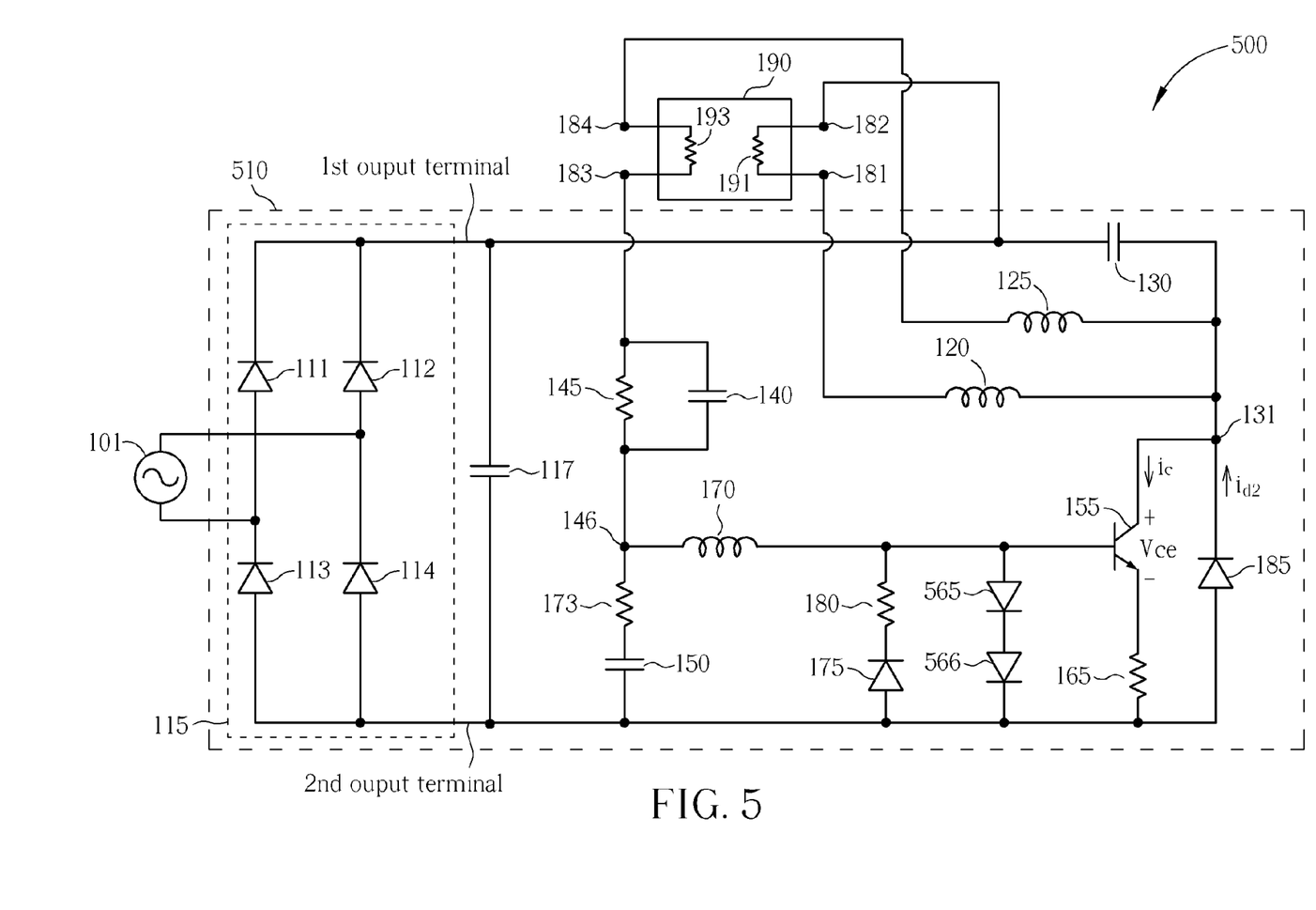
FIG. 5 is a circuit diagram schematically showing an electronic ballast in accordance with a fourth embodiment of the present invention.

Please refer to FIG. 5, which is a circuit diagram schematically showing an electronic ballast, with a passive limiter, in accordance with a fourth embodiment of the present invention. As shown in FIG. 5, the lighting system 500 comprises the ac input source 101, the lamp 190 and an electronic ballast 510. The electronic ballast 510 is similar to the electronic ballast 110 shown in FIG. 1, differing in that the passive limiter is added, and the PTC resistor 132 is omitted. The passive limiter comprises a third diode 565 and a fourth diode 566 coupled in series between the control end of the power switch 155 and the second output terminal of the rectifier circuit 115. Since the voltage drop of the second resistor 165 does not exceed one PN diode junction voltage, peak drive to the power switch 155 during the strike phase is restricted.

Figure 6:
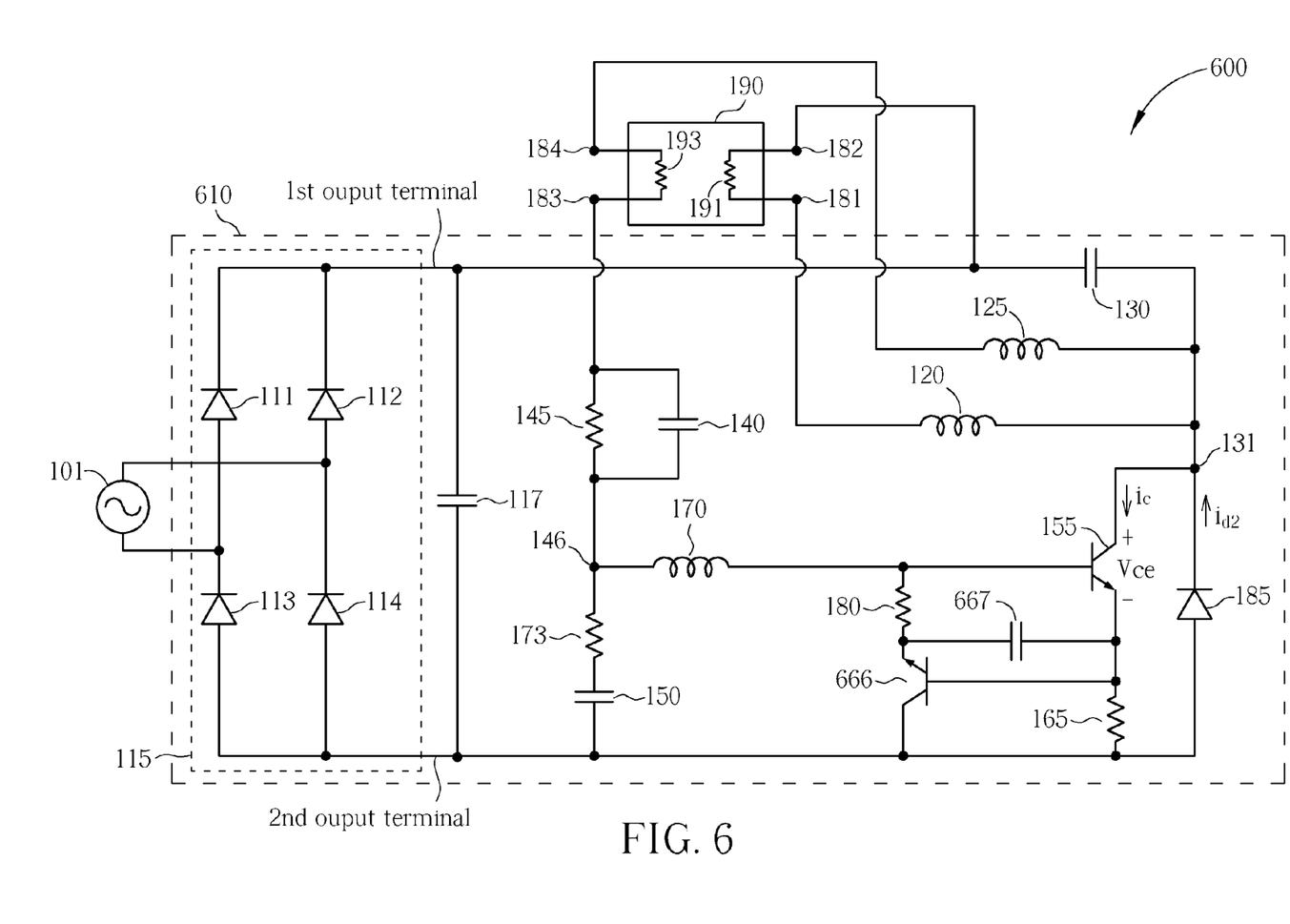
FIG. 6 is a circuit diagram schematically showing an electronic ballast in accordance with a fifth embodiment of the present invention.

Please refer to FIG. 6, which is a circuit diagram schematically showing an electronic ballast, with an active limiter, in accordance with a fifth embodiment of the present invention. As shown in FIG. 6, the lighting system 600 comprises the ac input source 101, the lamp 190 and an electronic ballast 610. The electronic ballast 610 is similar to the electronic ballast 110 shown in FIG. 1, differing in that the active limiter is added, and the PTC resistor 132 and the second diode 175 are omitted. The active limiter comprises an NPN transistor 666, the fourth resistor 180 and a fifth capacitor 667. The active limiter is coupled among the control and ground ends of the power switch 155 and the second output terminal of the rectifier circuit 115. The fourth resistor 180 and the fifth capacitor 667 are coupled in series between the control and ground ends of the power switch 155. The NPN transistor 666 is configured to allow large current flow from the second output terminal of the rectifier circuit 115 to the control and ground ends of the power switch 155 in the burn phase. However, it restricts the drive to the power switch 155 during the strike phase because the voltage drop of the second resistor 165 does not exceed the NPN base-collector junction voltage after switching to reverse conduction mode. The fifth capacitor 667 and the fourth resistor 180 adjust the charge storage time when the current flows from the second output terminal of the rectifier circuit 115 to the control end of the power switch 155 for suppressing a switching-transient voltage.

Figure 7:
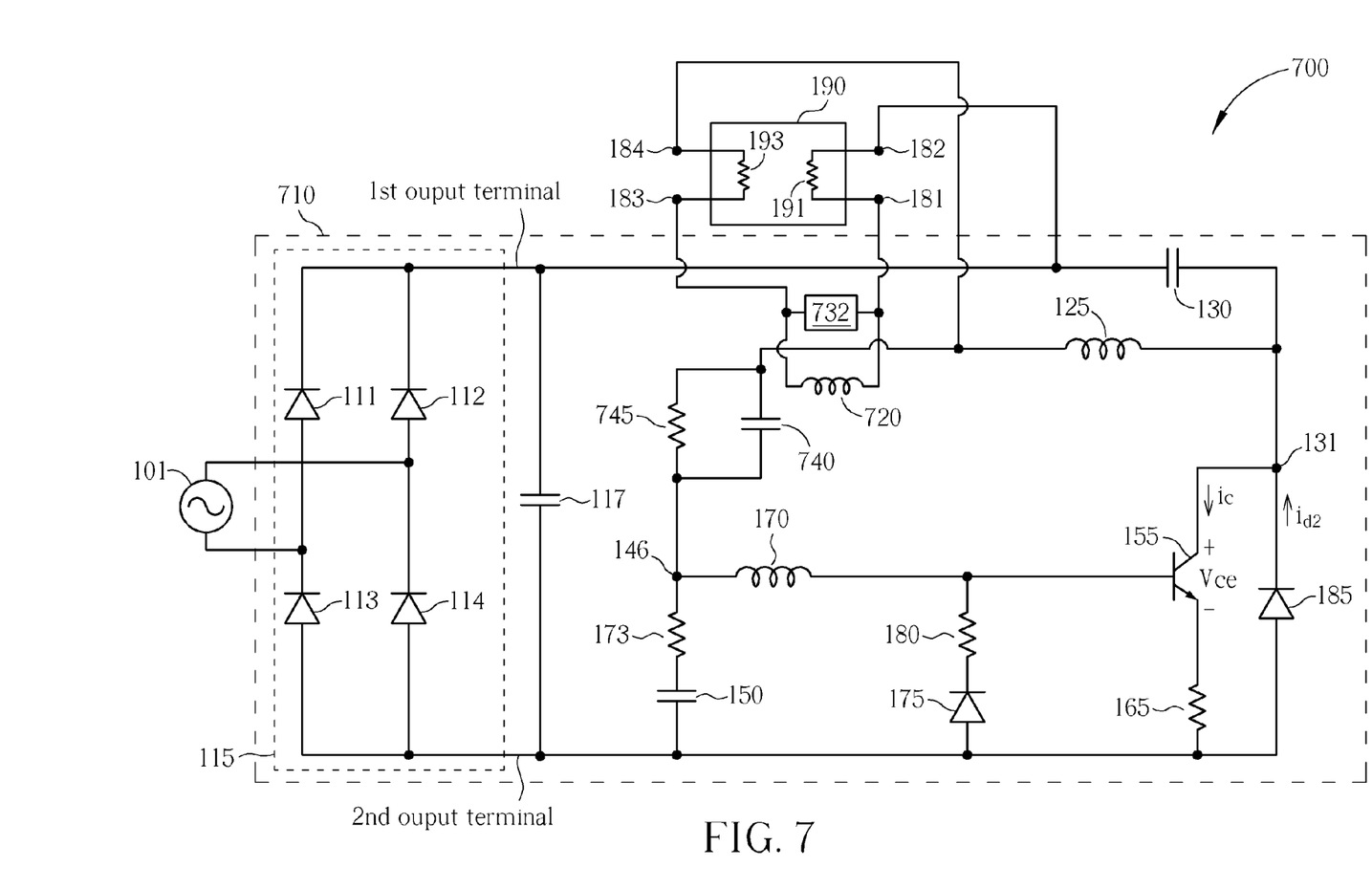
FIG. 7 is a circuit diagram schematically showing an electronic ballast in accordance with a sixth embodiment of the present invention.

Please refer to FIG. 7, which is a circuit diagram schematically showing an electronic ballast in accordance with a sixth embodiment of the present invention. As shown in FIG. 7, the lighting system 700 comprises the ac input source 101, the lamp 190 and an electronic ballast 710. The electronic ballast 710 is similar to the electronic ballast 110 shown in FIG. 1, differing in that the first inductor 120 is replaced with a first inductor 720 coupled across the lamp 190, the PTC resistor 132 is replaced with a PTC resistor 732, the second capacitor 140 is replaced with a second capacitor 740, and the first resistor 145 is replaced with a first resistor 745. The PTC resistor 732, the second inductor 125, the second capacitor 740 and the first resistor 745 are configured to retain dc continuity detections of the filament accordingly. Since the second inductor 125 ballasts the first inductor 720 and the lamp 190, the power switch 155 will see less current in operations.

In conclusion, the electronic ballast of the present invention is capable of promptly heating the filaments or avoiding over-driving situations for extending the lamp lifetime. Furthermore, the oscillating signal of the electronic ballast for use in the lighting system can be easily geared to achieve an exact positive feedback operation required for a self-oscillating ballast. Also the long charge storage time of a general-purpose diode is utilized to promote ZVS mode to avert damage to the power switch. Moreover, without the need of any trigger or disable circuit for activating power switch, the circuit structure of the electronic ballast can be significantly simplified to bring the cost down. Still, by taking advantage of negative lamp impedance, the electronic ballast is able to provide a power-regulating mechanism for stabilizing lamp power through suppressing lamp power variations caused by ac source variations. And the drive to the power switch before lamp power-regulating taking place is restricted.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. An electronic ballast comprising:
    a rectifier circuit having a pair of input terminals for receiving an ac input voltage and a pair of output terminals for outputting a dc voltage, wherein a first output terminal of the rectifier circuit is for coupling with a second node of a lamp;
    a first inductor having a second end for coupling with a first node of the lamp;
    a second inductor having a first end coupled with a fifth node and a second end for coupling with a fourth node of the lamp;
    a first capacitor having a first end coupled with the fifth node and a second end for coupling with the second node;
    a second capacitor having a first end coupled with a sixth node;
    a first resistor having a first end coupled with the sixth node;
    a second resistor coupled with a second output terminal of the rectifier circuit;
    a third capacitor and a third resistor coupled in series between the sixth node and the second output terminal of the rectifier circuit;
    a power switch having an output end, a ground end and a control end, wherein the output end is coupled with the fifth node and the ground end is coupled with the second resistor; and
    a third inductor coupled between the sixth node and the control end of the power switch.

2. The electronic ballast of claim 1, wherein the first inductor is configured for providing an ac current source.

3. The electronic ballast of claim 1, wherein the second capacitor and the third capacitor form a voltage divider for driving the power switch.

4. The electronic ballast of claim 3, wherein a quality factor (Q) regarding the voltage divider is lowered by the third resistor for equalizing the phase shift difference between a strike phase and a burn phase.

5. The electronic ballast of claim 1, wherein the second inductor and the second capacitor form a resonant network for striking the lamp.

6. The electronic ballast of claim 1, wherein the third inductor and the third capacitor form a resonant network having a resonant frequency below an operating frequency of the electronic ballast.

7. The electronic ballast of claim 1, wherein the second inductor, the third inductor, the second capacitor and the third capacitor in conjunction with the lamp are put in use together for providing a positive feedback.

8. The electronic ballast of claim 1, wherein a burned-out first filament of the lamp disconnects a dc source from the output end of the power switch and disables the lamp.

9. The electronic ballast of claim 1, wherein a burned-out filament of the lamp causes a startup dc bias to break up and disables the lamp.

10. The electronic ballast of claim 1, wherein the power switch comprises a bipolar junction transistor (BJT).

11. The electronic ballast of claim 1, wherein the second capacitor further has a second end for coupling with a third node of the lamp, the first resistor further has a second end for coupling with the third node of the lamp, the first inductor further has a first end coupled with the fifth node, and wherein the electronic ballast further comprises:
    a first diode and a fourth resistor coupled in series between the control end of the power switch and the second output terminal of the rectifier circuit, wherein the first diode is for directing current flow from the second output terminal of the rectifier circuit to the control end of the power switch;
    a second diode coupled with the fifth node and the second output terminal of the rectifier circuit, wherein the second diode is for directing current flow from the second output terminal of the rectifier circuit to the fifth node; and a PTC resistor coupled with the second node and the fourth node, for restricting a drive to the power switch during a strike phase.

12. The electronic ballast of claim 11, wherein the PTC resistor maintains isolation between filament dc continuity detections.

13. The electronic ballast of claim 11, wherein the first diode is for promoting a zero voltage-switching (ZVS) of the power switch.

14. The electronic ballast of claim 11, wherein the fourth resistor is selected in conjunction with a charge-storage time of the first diode for providing switching-transient voltage suppression.

15. The electronic ballast of claim 1, wherein the power switch comprises a metal oxide semiconductor (MOS) field effect transistor.

16. The electronic ballast of claim 15, further comprising:
a fourth capacitor, coupled between the control and ground ends of the power switch, for achieving zero voltage switching.

17. The electronic ballast of claim 1, further comprising:
a first diode and a fourth resistor coupled in series between the control end of the power switch and the second output terminal of the rectifier circuit, wherein the first diode is for directing current flow from the second output terminal of the rectifier circuit to the control end of the power switch;
a second diode coupled with the fifth node and the second output terminal of the rectifier circuit, wherein the second diode is for directing current flow from the second output terminal of the rectifier circuit to the fifth node; and
a passive limiter, coupled between the control end of the power switch and the second output terminal of the rectifier circuit, for restricting a drive to the power switch during a strike phase.

18. The electronic ballast of claim 17, wherein the passive limiter comprises a third diode and a fourth diode coupled in series.

19. The electronic ballast of claim 1, further comprising:
a first diode coupled with the fifth node and the second output terminal of the rectifier circuit, wherein the first diode is for directing current flow from the second output terminal of the rectifier circuit to the fifth node;
an active limiter coupled between the control end of the power switch and the second output terminal of the rectifier circuit; and
a fourth capacitor, coupled between the control and ground ends of the power switch, for adjusting an amount of storage charges.

20. The electronic ballast of claim 19, wherein the active limiter comprises an NPN transistor and a fourth resistor coupled in series.

21. The electronic ballast of claim 20, the NPN transistor is for directing current flow from the second output terminal of the rectifier circuit to the control end of the power switch in a burn phase under a forward conduction mode and for restricting current flow from the control end of the power switch to the second output terminal of the rectifier circuit in a strike phase under a reverse conduction mode.

22. The electronic ballast of claim 20, wherein the fourth resistor and the fourth capacitor are for adjusting a charge-storage time to suppress a switching-transient voltage.

23. The electronic ballast of claim 20, wherein the NPN transistor is for restricting a drive to the power switch during a strike phase.

24. The electronic ballast of claim 1, further comprising:
an input capacitor coupled with the output terminals of the rectifier circuit.

25. The electronic ballast of claim 1, wherein the second capacitor further has a second end for coupling with the fourth node of the lamp, the first resistor further has a second end for coupling with the fourth node of the lamp, the first inductor further has a first end for coupling with a third node of the lamp, and wherein the electronic ballast further comprises:
a first diode and a fourth resistor coupled in series between the control end of the power switch and the second output terminal of the rectifier circuit, wherein the first diode is for directing current flow from the second output terminal of the rectifier circuit to the control end of the power switch;
a second diode coupled with the fifth node and the second output terminal of the rectifier circuit, wherein the second diode is for directing current flow from the second output terminal of the rectifier circuit to the fifth node; and
a PTC resistor coupled with the first node and the third node, for restricting a drive to the power switch during a strike phase.

26. The electronic ballast of claim 25, wherein the second inductor ballasts the first inductor and the lamp.

27. A lighting system comprises:
an ac input source for generating an ac input voltage;
a lamp comprising a first filament and a second filament, wherein the first filament is coupled between a first node and a second node and the second filament is coupled between a third node and a fourth node; and
an electronic ballast coupled with the ac input source and the lamp for powering the lamp; the electronic ballast comprising:
a rectifier circuit having a pair of input terminals for receiving the ac input voltage and a pair of output terminals for outputting a dc voltage, wherein a first output terminal of the rectifier circuit is coupled with the second node;
an input capacitor coupled with the output terminals of the rectifier circuit;
a first inductor coupled with a fifth node and the first filament of the lamp;
a second inductor coupled with the fifth node and the second filament of the lamp;
a first capacitor coupled with the fifth node and the first filament of the lamp;
a second capacitor coupled with a sixth node and the second filament of the lamp;
a first resistor coupled with the sixth node and the second filament of the lamp;
a second resistor coupled with a second output terminal of the rectifier circuit;
a third capacitor and a third resistor coupled in series between the sixth node and the second output terminal of the rectifier circuit;
a power switch having an output end, a ground end and a control end, wherein the output end is coupled with the fifth node and the ground end is coupled with the second resistor; and
a third inductor coupled between the sixth node and the control end of the power switch.

28. The lighting system of claim 27, wherein a negative impedance of the lamp is utilized to stabilize a lamp power furnished to the lamp.

29. The lighting system of claim 27, wherein the lamp is a hot-cathode fluorescent lamp (HCFL), a cold-cathode fluorescent lamp (CCFL) or an external electrode fluorescent lamp (EEFL).

30. An electronic ballast comprising:

a rectifier circuit for receiving an ac input voltage and having a first output terminal for coupling with a second node of a lamp;

a first inductor having a first end coupled with a fifth node and a second end for coupling with a first node of the lamp;

a first resonant network, coupled with the fifth node and a sixth node, for striking the lamp;

a first capacitor having a first end coupled with the fifth node and a second end for coupling with the second node;

a first resistor having a first end coupled with the sixth node and a second end for coupling with a third node of the lamp;

a second resistor coupled with a second output terminal of the rectifier circuit;

a power switch having an output end, a ground end and a control end, wherein the output end is coupled with the fifth node and the ground end is coupled with the second resistor;

a voltage divider for driving the power switch; and a second inductor coupled between the sixth node and the control end of the power switch.

31. The electronic ballast of claim 30, wherein the voltage divider comprises a second capacitor, the second capacitor and the second inductor forming a second resonant network having a resonant frequency below an operating frequency of the electronic ballast.

* * * * *